United States Patent [19]

Ambrogio

[11] Patent Number: 5,607,174
[45] Date of Patent: Mar. 4, 1997

[54] FOLDING WHEELBARROW

[76] Inventor: Patrick Ambrogio, 323 Kramer Ave., Staten Island, N.Y. 10309

[21] Appl. No.: 442,681

[22] Filed: May 17, 1995

[51] Int. Cl.$^6$ .................................................. B62B 1/18
[52] U.S. Cl. ........................ 280/653; 280/47.2; 280/47.31
[58] Field of Search ................................ 280/645, 652, 280/653, 659, 43.1, 47.2, 47.23, 47.3, 47.31, 47.32, 47.33

[56] References Cited

U.S. PATENT DOCUMENTS

| | | | |
|---|---|---|---|
| 817,677 | 4/1906 | Smith | 280/47.23 |
| 2,624,588 | 1/1953 | Jones | 280/47.3 |
| 2,629,608 | 2/1953 | Jones | 280/653 |
| 2,672,348 | 3/1954 | Scott | 280/653 |
| 2,893,748 | 7/1959 | Coe | 280/47.3 |
| 2,947,058 | 1/1961 | Hoffmann, Jr. | 280/47.31 |
| 3,418,005 | 12/1968 | Allina | 280/659 |
| 3,826,511 | 7/1974 | Frank | 280/653 |
| 5,081,936 | 1/1992 | Drieling . | |
| 5,222,598 | 6/1993 | Yamazoe . | |

FOREIGN PATENT DOCUMENTS

| | | | |
|---|---|---|---|
| 256442 | 5/1963 | Australia | 280/47.31 |
| 49891 | 2/1941 | Netherlands | 280/47.3 |
| 8403122 | 5/1986 | Netherlands | 280/653 |
| 195196 | 6/1938 | Switzerland | 280/47.3 |
| 91/06560 | 5/1991 | WIPO | 280/47.31 |

Primary Examiner—Brian L. Johnson
Assistant Examiner—Min Yu
Attorney, Agent, or Firm—John G. Costa

[57] ABSTRACT

A folding wheelbarrow which is durable and also easy to store. The legs fold up against the frame and the wheel is suspended below the frame. This construction allows the topside of the frame to rest flush against a wall for storage.

3 Claims, 5 Drawing Sheets

5,607,174

FOLDING WHEELBARROW

BACKGROUND OF THE INVENTION

Wheelbarrows are used for the manual transport of small loads. Conventional wheelbarrows have rigid buckets which are fixed in place in a frame which rests on an anterior wheel and two posterior legs. The frame consists of two long handles which are attached directly or indirectly to an axle upon which the wheel rotates. A worker lifts the back end of the handles, thus raising the legs and, balancing the wheelbarrow on the single wheel, wheels the load to its destination.

The rigid bucket causes the wheelbarrow to take up space when the wheelbarrow is stored. In a cramped garage or tool shed this is a problem which has been addressed with the introduction of folding wheelbarrows. Most of the folding wheelbarrows introduced to date construct the bucket out of rigid folding panels.

U.S. Pat. No. 5,222,757 issued to Magyar, for a FOLD-UP WHEELBARROW introduced a bucket made of a plurality of sheet-like panels. The panels are made of materials such as nylon, reinforced plastic, and canvas. One end of each of the elongated members, or handles, is connected directly to the axle of the wheel and each handle pivots at that end to approximate the other handle for storage. A number of manoeuvres are required to fold the frame.

SUMMARY OF THE INVENTION

It is an object of this invention to introduce a folding wheelbarrow which is durable and also easy to store. The legs fold up against the frame and the wheel is suspended below the frame. This construction allows the topside of the frame to rest flush against a wall for storage. Another feature of the invention is the use of an anterior resting brace which serves as a platform upon which to rest the wheelbarrow as it stands on end for storage and serves also as a support upon which to pivot the wheelbarrow when dumping a load. The folding of the legs is the only requirement for storage.

DESCRIPTION OF THE INVENTION

Figure 3:
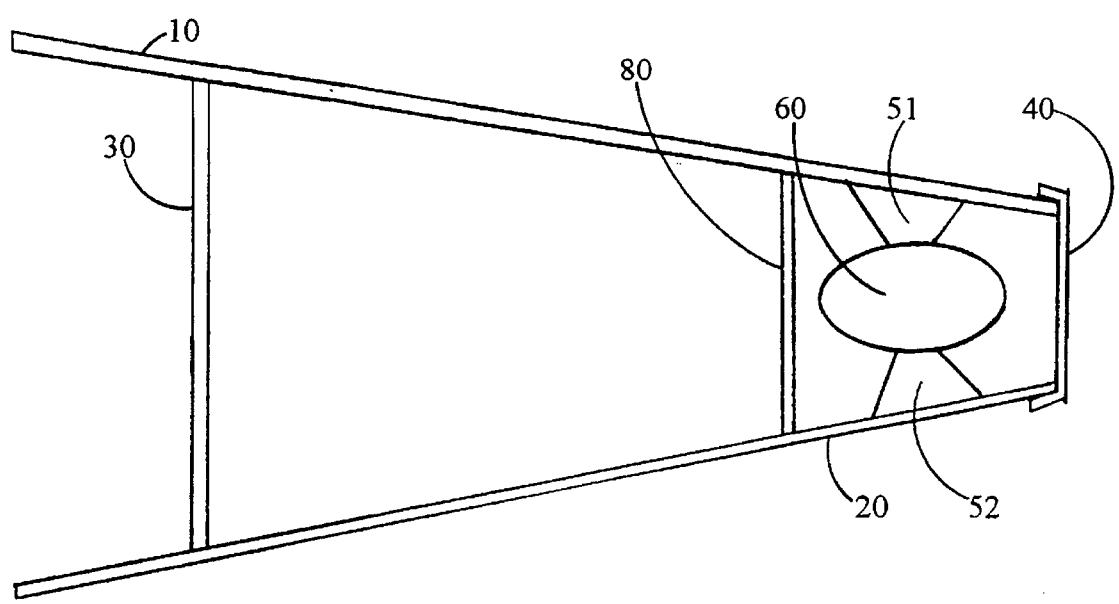
FIG. 3 is a top plan view of the frame of another embodiment of the invention.

Referring to FIG. 3, the frame of the wheelbarrow is comprised of a first elongate member 10, said elongate member having a first end and a second end; a second elongate member 20, said elongate member having a first end and a second end, wherein said first and second elongate members lie in the same plane and the distance between said first ends of said elongate members is less than the distance between said second ends of said elongate members; an anterior resting brace 40 having a first end and a second end, one end of said anterior resting brace being connected to the first end of said first elongate member, and the other end of said anterior resting brace being connected to the first end of said second elongate member; at most one anterior bucket support brace 80 having a first end and a second end, one said end of said anterior bucket support brace being connected to said first elongate member, and the other end of said anterior bucket support brace being connected to said second elongate member; a posterior bucket support brace 30 having a first end and a second end, one end of said posterior bucket support brace being connected to said first elongate member, and the other end of said posterior bucket support brace being connected to said second elongate member.

Figure 4:
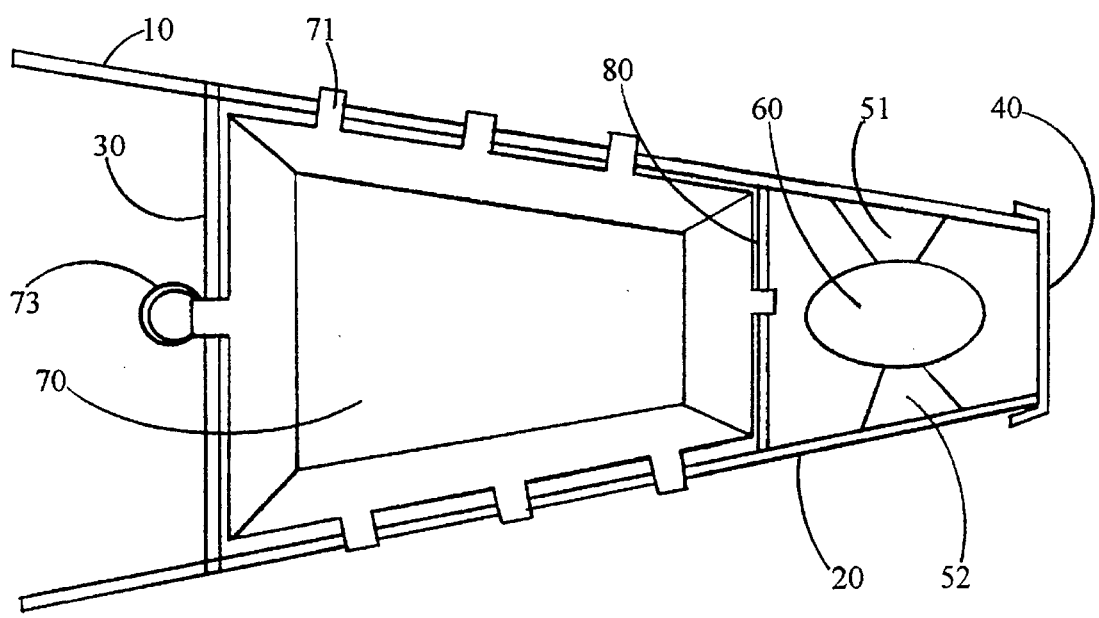
FIG. 4 is a top plan view of another embodiment of a wheelbarrow according to the invention.

Referring to FIG. 4, a removable bucket 70 is removably attached by bucket support means 71 to at least two parts of said frame of FIG. 3, said parts of said frame being chosen from the group consisting of a first elongate member 10, a second elongate member 20, an anterior bucket support brace 80, and a posterior bucket support brace 30, and said removable bucket is disposed between said first and second elongate members, posterior to said anterior bucket support brace, and anterior to said posterior bucket support brace; and a steering wheel 60. Said steering wheel is disposed between said first and second elongate members, posterior to said anterior resting brace 40, and anterior to said anterior bucket support brace 80. Said wheel support means comprises an axle, said axle having a first end extending from one side of said wheel and a second end extending from the other side of said wheel, a first wheel support member 51 extending between and being attached to the first end of said axle and said first elongate member, and a second wheel support member 52 extending between and being attached to the second end of said axle and said second elongate member.

Figure 5:
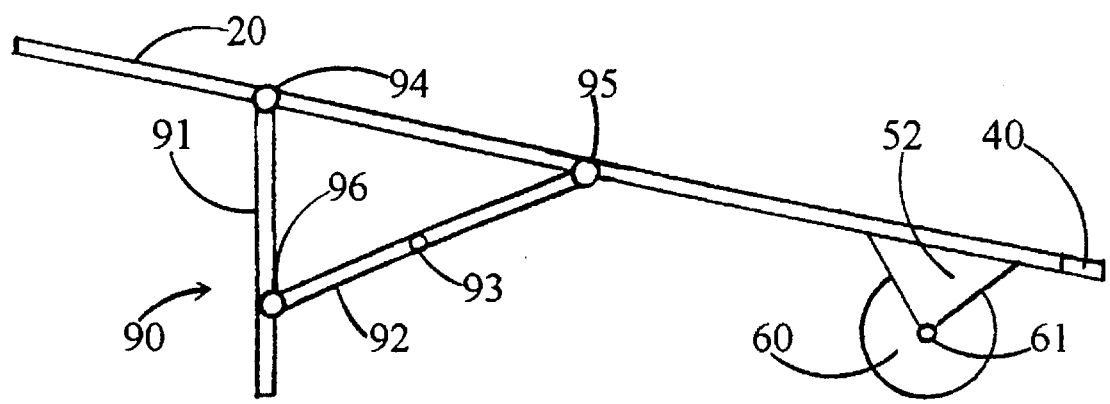
FIG. 5 is a side elevation view of the frame of the invention.

Referring to FIG. 5, said steering wheel 60 is rotatably attached to the axle 61 of a wheel support means. The posterior resting brace 90 comprises a leg 91 and a folding support arm 92. The folding support arm is hinged at hinge 93 and hingedly connected to said leg at hinge 96. The posterior resting brace is hingedly connected to elongate member 20 by hinges 94 and 95. Although not shown, a second posterior resting brace is attached in like manner to elongate member 10. One or more cross braces can be attached between the legs of the posterior resting braces for additional support. All of the hinges can lock in place for safety during operation.

Figure 1:
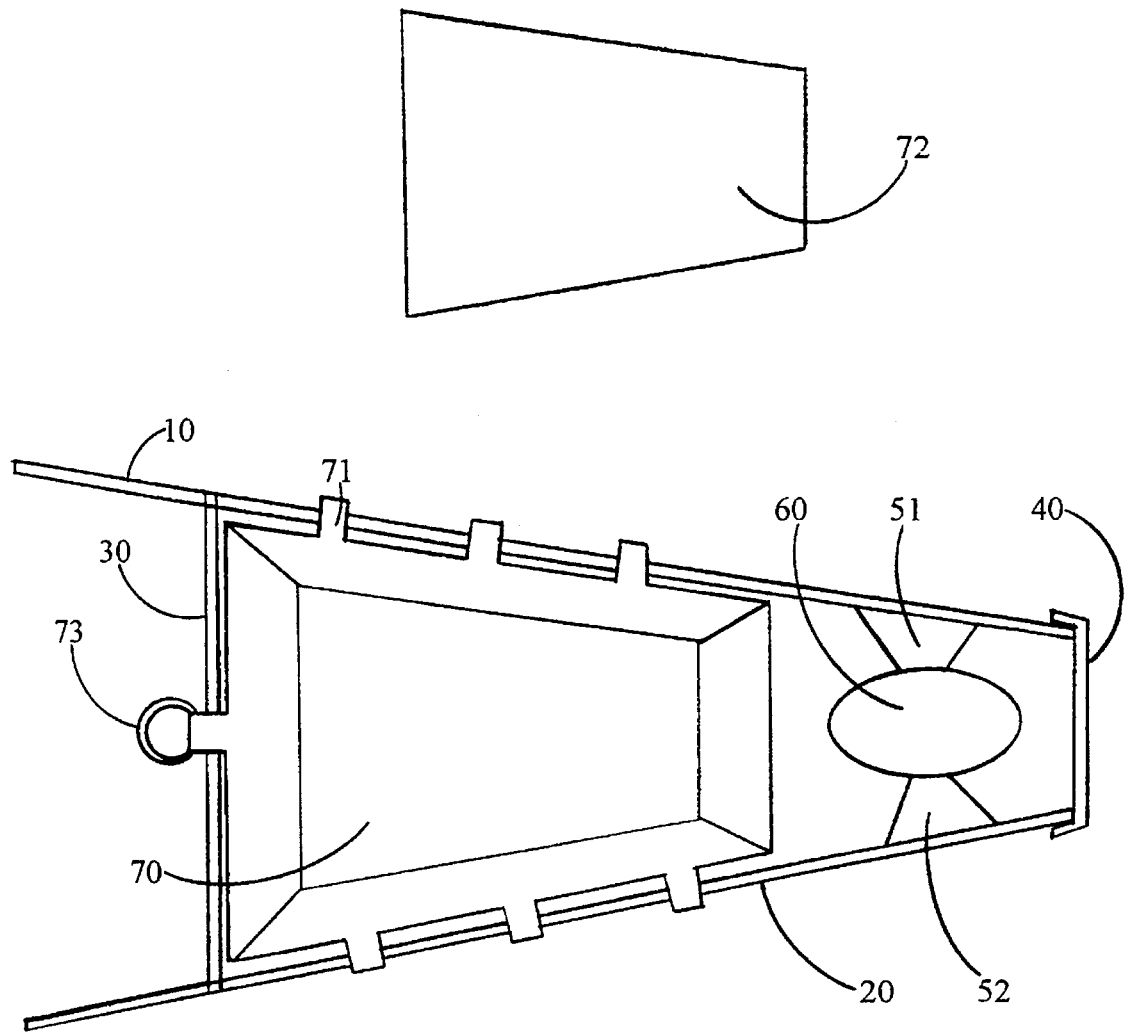
FIG. 1 is a top plan view of a wheelbarrow according to the invention.
Figure 2:
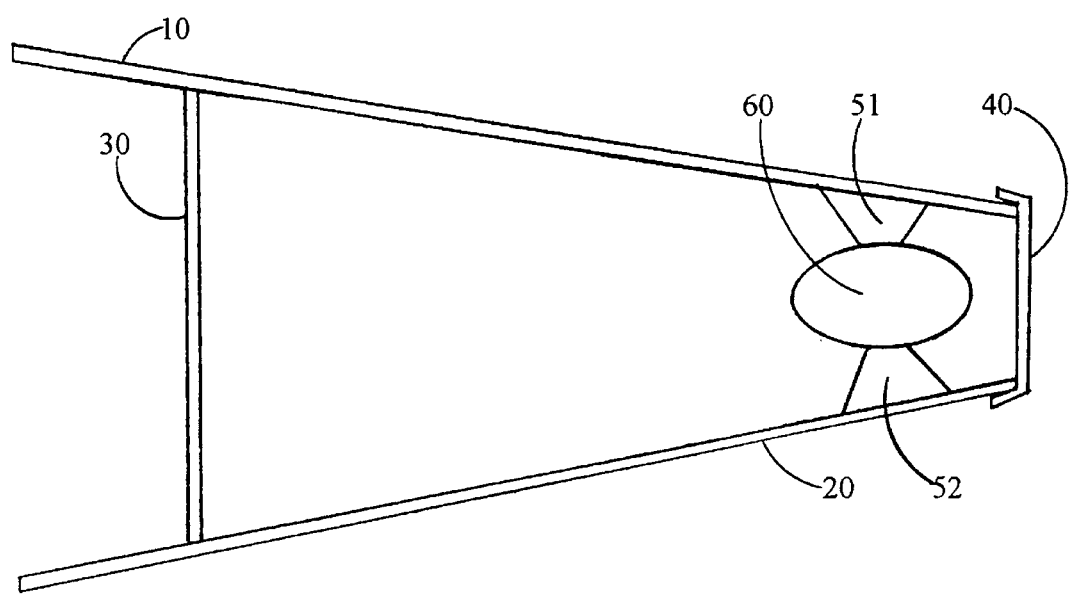
FIG. 2 is a top plan view of the frame of FIG. 1.

FIG. 1 illustrates another embodiment of the wheelbarrow of this invention wherein the frame is constructed without the anterior bucket support brace. FIG. 2 illustrates the frame of FIG. 1.

The parts of the frame can be made of wood, metal, plastic or rubber. The parts of the frame can be connected to other parts of the frame by means of conventional fasteners, such as screws, bolts, and braces or by conventional joints, such as tongue in grove, dovetail, or mortise joints. However, it is noted that an additional benefit of the design of the frame is that the frame can be molded in one piece from plastic, rubber, metal or wood particles.

In accordance with the preferred embodiment of this invention, the bucket is made of a flexible nylon weave which is covered on both sides by a flexible polyurethane material. However, any flexible material, including fabrics made from polyester fibers, plastics, polyethylene, natural fibers, flexible rubber and canvas, can be used in making the bucket. Typically, the flexible bucket is constructed with a bottom panel, two side panels and a rear panel, wherein the anterior of the bottom panel extends to the top of the side panels. In another embodiment, the flexible bucket is constructed with a front panel, a bottom panel, two side panels and a rear panel. However, it should be noted that the bucket can be of a variety of shapes.

In the preferred embodiment, the bucket support means consists of flexible straps. These flexible straps are sewn to the fabric, extend over the frame and are reflected back onto the bucket where they are attached to the body of the bucket by snaps, hook and eye, or any other suitable fastening means. However, for the flexible bucket, the bucket support means can consist of straps, hooks, or any other suitable fastener, to enable the bucket to be removably attached to the frame.

In a further embodiment of this invention, the removable bucket can be made of a rigid material, wherein said rigid material is selected from the group consisting of wood, plastic, inflexible rubber and metal. When a rigid, removable bucket is employed, the bucket support means may consist of straps or hooks. Straps can be extended from one part of the frame to another, allowing the bucket to rest upon the straps or straps can pass through eyes in the bucket and around parts of the frame and then fastened onto themselves with snaps, hook and eye, or any other suitable fastening means. Hooks may pass through eyes in the rigid bucket, allowing the bucket to be suspended from the frame. The bucket may be molded with hook-like extensions which can be draped over the frame allowing the bucket to be suspended.

Another aspect of the preferred embodiment is the provision of a rigid bucket insert, 72 in FIG. 1, for use in the bucket made of flexible material, wherein said insert is made of a rigid material selected from the group consisting of wood, plastic, rubber and metal. In the preferred embodiment, the bucket insert is contoured to the shape of part, usually the bottom, of the bucket. One use of the rigid insert is to allow shoveling without damage to the flexible bucket. Another use of the rigid insert is to provide a flat surface for transport when such a flat surface is desirable.

In the preferred embodiment, the axle is below the plane defined by the elongate members. This feature allows the frame to rest flat against a wall for storage.

In the preferred embodiment, at least one cross brace extends between the legs of two posterior resting braces. Furthermore, in the preferred embodiment, all of the hinges, 93, 94, and 95, of the posterior resting braces lock in position for added safety.

In the preferred embodiment, the legs of the posterior resting braces fold up against the bottom of the frame. However, as an alternative design choice, the hinges can be mounted so that the legs fold up to lie in the same plane as the first and second elongate members.

A further optional feature is the ring, 73 in FIG. 1, which can be used to hang the bucket or the wheelbarrow for storage. Other rings or devices can be attached to the frame to allow hanging the frame with or without the bucket.

What is claimed is:

1. A wheelbarrow comprising a frame, a bucket, a bucket insert a first posterior resting brace, a second posterior resting brace, at least one cross brace, a steering wheel, and a wheel support means;

said frame comprising:

a first elongate member, said elongate member having a first end and a second end;

a second elongate member, said elongate member having a first end and a second end, wherein said first and second elongate members are rigid one piece members and lie in the same plane and the distance between said first ends of said elongate members is less than the distance between said second ends of said elongate members;

an anterior resting brace having a first end and a second end, one end of said anterior resting brace being connected to the first end of said first elongate member, and the other end of said anterior resting brace being connected to the first end of said second elongate member;

said anterior resting brace being a platform upon which to rest the wheelbarrow as it stands on end for storage;

said anterior resting brace being a support upon which to pivot the wheelbarrow when dumping a load; at most one anterior bucket support brace having a first end and a second end, one said end of said anterior bucket support brace being connected to said first elongate member, and the other end of said anterior bucket support brace being connected to said second elongate member;

a posterior bucket support brace having a first end and a second end, one end of said posterior bucket support brace being connected to said first elongate member, and the other end of said posterior bucket support brace being connected to said second elongate member;

said frame constructed to permit the top of said frame to rest flat against a wall for storage;

said bucket being made of panels of flexible material, said panels comprising a bottom panel, two side panels, a rear panel and at most one front panel;

removably attached by bucket support means to at least two parts of said frame, said parts of said frame being chosen from the group consisting of a first elongate member, a second elongate member, an anterior bucket support brace and a posterior bucket support brace, and disposed between said first and second elongate members, posterior to said anterior bucket support brace, and anterior to said posterior bucket support brace;

said bucket insert being made of a rigid material selected from the group consisting of wood, plastic and metal, and contoured to the shape of part of said bucket.

said first posterior resting brace comprising a first leg, said first leg being hingedly connected to said first elongate member, and a first folding support arm foldable at a lockable hinge, said first folding support arm having a first end and a second end, said first folding support arm being hingedly connected at said first end to said first elongate member, and said first folding support arm being hingedly connected at said second end to said first leg.

said second posterior resting brace comprising a second leg, said second leg being hingedly connected to said second elongate member, and a second folding support arm foldable at a lockable hinge, said second folding support arm having a first end and a second end, said second folding support arm being hingedly connected at said first end to said second elongate member, and said second folding support arm being hingedly connected at said second end to said second leg.

said cross brace having two ends wherein one end is attached to said first leg and the other end is attached to said second leg.

said steering wheel being rotatably attached to the axle of a wheel support means and said steering wheel being disposed between said first and second elongate members, posterior to said anterior resting brace, and anterior to said anterior bucket support brace;

said wheel support means comprising an axle which is below the plane defined by the elongate members, said axle having a first end extending from one side of said wheel and a second end extending from the other side of said wheel, a first wheel support member extending between and being attached to the first end of said axle and said first elongate member, and a second wheel support member extending between and being attached to the second end of said axle and said second elongate member.

2. The wheelbarrow of claim 1 wherein the frame is molded in one piece.

3. The wheelbarrow of claim 1 wherein said bucket insert is contoured to the shape of the bottom of said bucket.

* * * * *